United States Patent
Li et al.

(10) Patent No.: US 12,307,725 B2
(45) Date of Patent: May 20, 2025

(54) POINT CLOUD INTRA PREDICTION METHOD AND DEVICE BASED ON WEIGHTS OPTIMIZATION OF NEIGHBORS

(71) Applicant: Peking University Shenzhen Graduate School, Guangdong (CN)

(72) Inventors: Ge Li, Guangdong (CN); Qi Zhang, Guangdong (CN); Yiting Shao, Guangdong (CN); Jing Wang, Guangdong (CN)

(73) Assignee: Peking University Shenzhen Graduate School (CN)

( * ) Notice: Subject to any disclaimer, the term of this patent is extended or adjusted under 35 U.S.C. 154(b) by 630 days.

(21) Appl. No.: 17/631,333

(22) PCT Filed: Sep. 11, 2019

(86) PCT No.: PCT/CN2019/105308
§ 371 (c)(1),
(2) Date: Jul. 12, 2022

(87) PCT Pub. No.: WO2021/022621
PCT Pub. Date: Feb. 11, 2021

(65) Prior Publication Data
US 2023/0196625 A1 Jun. 22, 2023

(30) Foreign Application Priority Data
Aug. 5, 2019 (CN) .......................... 201910717002.5

(51) Int. Cl.
*G06K 9/00* (2022.01)
*G06T 9/00* (2006.01)
(52) U.S. Cl.
CPC .................................. *G06T 9/001* (2013.01)

(58) Field of Classification Search
CPC ...................................................... G06T 9/001
See application file for complete search history.

(56) References Cited

U.S. PATENT DOCUMENTS

| 11,170,556 B2 * | 11/2021 | Oh ......................... G06T 15/04 |
| 2002/0161763 A1 * | 10/2002 | Ye .......................... G06F 21/55 |

(Continued)

FOREIGN PATENT DOCUMENTS

| CN | 101650838 A | 2/2010 |
| CN | 106203530 A * | 12/2016 |

(Continued)

OTHER PUBLICATIONS

SEGCloud: Semantic Segmentation of 3D Point Clouds, Lyne P. Tchapmi, IEEE, 2017, pp. 537-547 (Year: 2017).*

(Continued)

*Primary Examiner* — Jayesh A Patel
(74) *Attorney, Agent, or Firm* — The Belles Group, P.C.

(57) ABSTRACT

The present invention provides a point cloud intra prediction method and device based on weights optimization of neighbors. The invention relates to intra prediction for point cloud attribute compression, by optimizing the weights of the neighboring points on the basis of the density of the point cloud in three directions, i.e. x, y and z directions, and specifically, calculating the optimized weight of each neighboring point by optimizing corresponding coefficients of three coordinate components, i.e. x, y and z coordinate components of distances. The invention can improve the accuracy of intra prediction by means of enhancing the utilization of the overall geometric information of the point cloud, and then transformation, quantification and entropy are carried out on the prediction residuals, such that a better point cloud attribute compression performance is achieved.

7 Claims, 3 Drawing Sheets

(56) References Cited

U.S. PATENT DOCUMENTS

| | | | |
|---|---|---|---|
| 2018/0053324 A1 | 2/2018 | Cohen et al. | |
| 2019/0075320 A1* | 3/2019 | Mammou | H04N 19/597 |
| 2019/0311500 A1* | 10/2019 | Mammou | G06T 9/001 |
| 2020/0043199 A1* | 2/2020 | Chang | G06T 9/001 |
| 2020/0111237 A1* | 4/2020 | Tourapis | H04N 19/597 |
| 2020/0302651 A1* | 9/2020 | Flynn | G06T 9/20 |
| 2022/0005230 A1* | 1/2022 | Li | G06T 7/75 |

FOREIGN PATENT DOCUMENTS

| | | | | |
|---|---|---|---|---|
| CN | 109257604 A | | 1/2019 | |
| CN | 109889840 A | | 6/2019 | |
| EP | 3429206 A1 | * | 1/2019 | |
| EP | 3614673 A1 | * | 2/2020 | G06T 17/00 |

OTHER PUBLICATIONS

Bayesian Point Cloud Reconstruction, P. Jenke et al., Eurographics, 2006, pp. 379-388 (Year: 2006).*

Architectures for MPEG Compressed Bit stream Scaling, Huifang Sun et al., IEEE, 1996, pp. 191-199 (Year: 1996).*

\* cited by examiner

| Lossless geometry | Rate-distortion of the attribute | | | |
|---|---|---|---|---|
| and lossy attributes | Luminance | Chromaticity Cb | Chromaticity Cr | Reflectance |
| Merged data set of Category 3 data set | −0.4% | −1.3% | −1.1% | −1.8% |
| Multi-frame data set of Category 3 data set | None | None | None | −7.5% |
| Category 3 data set | −0.4% | −1.3% | −1.1% | −5.8% |

Fig. 3A

| Lossless geometry | Rate-distortion of the attribute | | | |
|---|---|---|---|---|
| and lossy attributes | Luminance | Chromaticity Cb | Chromaticity Cr | Reflectance |
| Merged data set of Category 3 data set | −1.9% | −2.7% | −3.0% | −1.9% |
| Multi-frame data set of Category 3 data set | None | None | None | −7.1% |
| Category 3 data set | −1.9% | −2.7% | −3.0% | −5.5% |

Fig. 3B

POINT CLOUD INTRA PREDICTION METHOD AND DEVICE BASED ON WEIGHTS OPTIMIZATION OF NEIGHBORS

CROSS-REFERENCE TO RELATED PATENT APPLICATIONS

The present application is a U.S. national stage application under 35 U.S.C. § 371 of PCT Application No. PCT/CN2019/105308, filed Sep. 11, 2019, which claims priority to Chinese Patent Application No. 201910717002, filed Aug. 5, 2019. The disclosures of the aforementioned priority applications are incorporated herein by reference in their entireties.

TECHNICAL FIELD

The present invention belongs to the field of point cloud compression, relates to a point cloud data compression method and particularly relates to a point cloud intra prediction method and device based on weights optimization of neighbors.

BACKGROUND ART

A three-dimensional point cloud is an important form of digitalization of the real world. With the rapid development of three-dimensional scanning devices (laser, radar, etc.), the precision and the resolution of the point cloud are higher. The high-precision point cloud is widely applied to construction of an urban digital map and plays a technical supporting role in popular researches such as smart city, unmanned driving, preservation of cultural relics and the like. The point cloud is acquired by sampling the surface of an object by the three-dimensional scanning devices. The number of points in a frame of point cloud is generally several millions, wherein each point contains geometric information, color, reflectance and other attribute information, and the data volume is huge. The huge data volume of the three-dimensional point clouds bring great challenge to data storage, transmission and the like, so the compression of the point clouds is very necessary. The compression of the point cloud is mainly divided into geometry compression and attribute compression. At present, an attribute compression framework of the point cloud described in a test platform TMC13v6 (Test Model for Category 1&3 version 6) provided by MPEG (Moving Picture Experts Group) mainly includes:

1. A lifting transform strategy based on LODs (Level of Detail): the method comprises: firstly, constructing the LODs with the point cloud after sorting based on Morton codes, namely, carrying out down-sampling on the sorted points according to the preset number of layers of the LODs, wherein the points obtained after sampling each time form a layer of LODs, and the sampling distances vary from large to small until the whole LODs are constructed; then, looking for neighbors for the points in the point cloud according to the order of the LODs, wherein a weighted average of all the neighbors is taken as a predicted value, and the weight of each neighbor is a reciprocal value of the square of the Euclidean distance; and finally, subtracting the predicted value from an actual value of a current point, updating the weights of the points in the next layer of LODs with residual values of the points in the layer of LODs and completing a lifting operation;

2. An intra prediction mode decision-making method based on LODs: the process of constructing the LODs in the method is the same as the above descriptions, and the method also comprises: looking for K neighbors at most for each point according to a KNN (K-Nearest Neighbor) algorithm after the LODs are constructed, so as to obtain K+1 prediction modes which respectively take a first neighbor, a second neighbor . . . a $K^{th}$ neighbor as predicted reference values, and also take a weighted average of the K neighbors as a predicted reference value; and then performing RDO (Rate Distortion Optimization) and determining which prediction mode is finally selected as an intra prediction reference value of the current point;

3. An attribute compression method of the point cloud based on RAHT (Region-Adaptive Hierarchical Transform): the method mainly takes the use of a novel transform algorithm; the method is different from the traditional DCT (Discrete Cosine Transform); in RAHT, intra-block attribute values generated by an octree are merged in three dimensions (x, y and z), and a group of high-frequency coefficients and a group of low-frequency coefficients are generated after merging every time until the intra-block attribute values are merged to a root node; and signals that need to be coded and transmitted finally are all the high-frequency coefficients and the low-frequency coefficient finally generated at the root node.

SUMMARY OF THE INVENTION

For point cloud attribute compression based on lifting transform of Level of Detail (LODs), in order to improve the accuracy of intra attribute prediction and better utilize the relationship between the attribute and the spatial coordinates, according to a density degree of distribution of points in a point cloud in three directions, i.e., x, y and z directions, the present invention provides an intra prediction method on the basis of the density of the point cloud in three directions, i.e. x, y and z directions, calculating the optimized weight of each neighboring point by optimizing corresponding coefficients of three coordinate components, i.e., x, y and z coordinate components of distances, so that the attribute compression performance of the point cloud is improved.

The technical solution provided by the present invention is described as follows:

According to one aspect of the present invention, the present invention provides a point cloud intra prediction method and device based on weights optimization of neighbors, which comprises steps 1)-5) executed at a an encoder: step 1): traversing points in a point cloud and respectively adding the points into LODs thereof; step 2): determining K nearest neighboring points of a current point; step 3): calculating an optimized weight of each nearest neighboring point in the K nearest neighboring points of the current point according to coordinates of the current point and coordinates of the K nearest neighboring points; step 4): carrying out weighted summation on attribute reconstruction values of the K nearest neighboring points by utilizing the optimized weights of the K nearest neighboring points of the current point, so as to obtain an attribute prediction value of the current point; and step 5): carrying out encoding processing according to the attribute prediction value of the current point, so as to obtain a bitstream. The method comprises steps 6)-10) executed at a decoder, wherein the steps 6)-9) are the same as the steps 1)-4); and the step 10) comprises: carrying out decoding processing according to the attribute prediction value of the current point, so as to obtain an attribute reconstruction value of the current point.

Preferably, in the above method, the step 2) comprises: determining the K nearest neighboring points of the current point according to spatial distances from the points in the point cloud to the current point.

Preferably, in the above method, a method for one of the K nearest neighboring points in the step 3) comprises: calculating the differences between the current point and the nearest neighboring point on three coordinate components, i.e., x, y and z coordinate components, and calculating the square values respectively, so as to obtain quadratic differences between the current point and the nearest neighboring point on the three coordinate components, i.e., the x, y and z coordinate components; respectively multiplying the quadratic differences between the current point and the nearest neighboring point on the three coordinate components, i.e., the x, y and z coordinate components by corresponding coefficients $\alpha$, $\beta$ and $\gamma$, so as to obtain weighted quadratic differences between the current point and the nearest neighboring point on the three coordinate components, i.e., the x, y and z coordinate components, wherein $\alpha$, $\beta$ and $\gamma$ are constants, and default values of $\alpha$, $\beta$ and $\gamma$ are 1, 1, 1 and can be modified and set; summing the three weighted quadratic differences between the current point and the nearest neighboring point on the three coordinate components, i.e., the x, y and z coordinate components, so as to obtain a weighted distance square value between the current point and the nearest neighboring point; and calculating a reciprocal value of the weighted distance square value between the current point and the nearest neighboring point, so as to obtain the optimized weight of the nearest neighboring point.

Preferably, in the above method, the step 4) comprises: acquiring the optimized weight and the attribute reconstruction value of each nearest neighboring point in the K nearest neighboring points of the current point; dividing the optimized weight of each nearest neighboring point in the K nearest neighboring points of the current point by the sum of the optimized weights of the K nearest neighboring points, so as to obtain relative weights of the K nearest neighboring points of the current point; and multiplying the relative weight by an attribute reconstruction value of each nearest neighboring point in the K nearest neighboring points of the current point respectively, and summing the K products, so as to obtain the attribute prediction value of the current point.

Preferably, in the above method, the step 5) comprises: determining a prediction residual of the current point by calculating the difference between an attribute value and the attribute prediction value of the current point and determining a prediction residual of the current point; and encoding the prediction residual by carrying out transformation, quantization and entropy coding, so as to obtain a bitstream.

Preferably, in the above method, the step 10) comprises: carrying out entropy decoding of a bitstream, inverse quantization and inverse transformation, so as to obtain the prediction residual of the current point; and determining the attribute reconstruction value of the current point according to the sum of the attribute prediction value and the prediction residual of the current point.

According to another aspect of the present invention, the prevent invention also provides a device for point cloud intra prediction, which comprises a point cloud encoding device or/and a point cloud decoding device, wherein the point cloud encoding device comprises: a first determination module used for determining K nearest neighboring points of the current point according to the spatial distances from the points in the point cloud to the current point; a second determination module used for calculating an optimized weight of each nearest neighboring point in the K nearest neighboring points of the current point according to coordinates of the current point and coordinates of the K nearest neighboring points; a third determination module used for carrying out weighted summation on the attribute reconstruction values of the K nearest neighboring points by utilizing the optimized weights of the K nearest neighboring points of the current point, so as to obtain an attribute prediction value of the current point; and an encoding module used for carrying out encoding processing according to the attribute prediction value of the current point, so as to obtain a bitstream. The point cloud decoding device comprises: a first determination module used for determining K nearest neighboring points of the current point; a second determination module used for calculating an optimized weight of each nearest neighboring point in the K nearest neighboring points of the current point according to coordinates of the current point and coordinates of the K nearest neighboring points; a third determination module used for carrying out weighted summation on the attribute reconstruction values of the K nearest neighboring points by utilizing the optimized weights of the K nearest neighboring points of the current point, so as to obtain an attribute prediction value of the current point; and a decoding module used for carrying out decoding processing according to the attribute prediction value of the current point, so as to obtain an attribute reconstruction value of the current point.

Preferably, in the above device, the second determination module specifically used for calculating an optimized weights of each nearest neighboring point in the K nearest neighboring points of the current point comprises: calculating differences between the current point and the nearest neighboring point on the three coordinate components, i.e., the x, y and z coordinate components, and calculating square values respectively, so as to obtain quadratic differences between the current point and the nearest neighboring point on the three coordinate components, i.e., the x, y and z coordinate components; respectively multiplying the quadratic differences between the current point and the nearest neighboring point on the three coordinate components, i.e., the x, y and z coordinate components by corresponding coefficients $\alpha$, $\beta$ and $\gamma$, so as to obtain weighted quadratic differences between the current point and the nearest neighboring point on the three coordinate components, i.e., the x, y and z coordinate components, wherein $\alpha$, $\beta$ and $\gamma$ are constants, and default values of $\alpha$, $\beta$ and $\gamma$ are 1, 1, 1 and can be modified and set; summing the three weighted quadratic differences between the current point and the nearest neighboring point on the three coordinate components, i.e., the x, y and z coordinate components, so as to obtain a weighted distance square value between the current point and the nearest neighboring point; and calculating the reciprocal value of the weighted distance square value between the current point and the nearest neighboring point, so as to obtain the optimized weight of the nearest neighboring point.

Preferably, in the above device, the third determination module is specifically used for: acquiring the optimized weight and the attribute reconstruction value of each nearest neighboring point in the K nearest neighboring points of the current point; dividing the optimized weight of each nearest neighboring point in the K nearest neighboring points of the current point by the sum of the optimized weights of the K nearest neighboring points, so as to obtain the relative weights of the K nearest neighboring points of the current point; and multiplying the relative weight by an attribute reconstruction value of each nearest neighboring point in the K nearest neighboring points of the current point respectively, and summing the K products, so as to obtain the attribute prediction value of the current point.

Preferably, in the above device, the encoding module is specifically used for: determining a prediction residual of the current point by calculating the difference between an attribute value and the attribute prediction value of the current point; and encoding the prediction residual by carrying out transformation, quantization and entropy coding, so as to obtain a bitstream.

Preferably, in the above device, the decoding module is specifically used for: carrying out entropy decoding of a bitstream, inverse quantization and inverse transformation, so as to obtain a prediction residual of the current point; and determining the attribute reconstruction value of the current point according to the sum of the attribute prediction value and the prediction residual of the current point.

The present invention has the beneficial effects that:

The present invention provides the point cloud intra prediction method and device based on weights optimization of neighbors. The method adopts the following solution: when intra prediction is performed on attribute compression of the point cloud, the weights of the neighbors referred to by the points in the point cloud are optimized based on the density degree difference of the point cloud in the three directions, i.e., the x, y and z directions; and specifically, the coefficients of the components with a distance in the three directions, i.e., the x, y and z directions are optimized when the weights of the neighbors are calculated. According to the method, the accuracy of intra prediction can be improved by means of enhancing the utilization of overall geometric information of the point cloud; and then transformation, quantification and entropy coding are carried out on the prediction residuals, so that a better point cloud attribute compression performance is achieved.

BRIEF DESCRIPTION OF THE DRAWINGS

FIG. 3A is a performance contrast diagram of benchmark results of an embodiment and a test platform TMC13v6 under conditions of lossless geometry and lossy attributes;

FIG. 3B is a performance contrast diagram of benchmark results of the embodiment and the test platform TMC13v6 under conditions of lossy geometry and lossy attributes.

DETAILED DESCRIPTION OF THE INVENTION

Figure 1:
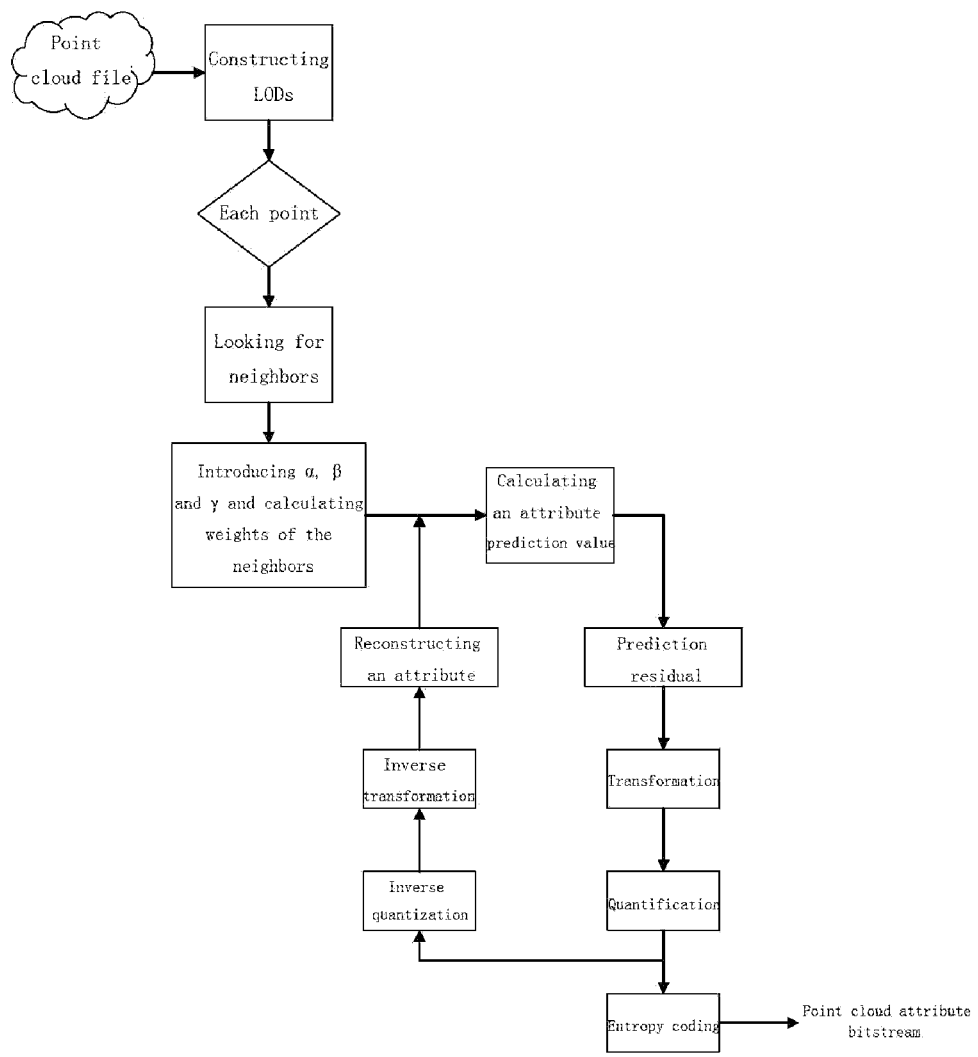
FIG. 1 is a schematic diagram of a flow of an attribute compression encoder of an embodiment.

The present invention is further described by embodiments hereinafter in combination with the drawings, but the scope of the present invention is not limited by any manner.

According to the present invention which is a point cloud intra prediction method based on weights optimization of neighbors, in an attribute compression module of the point cloud, when the weights of the neighbors are calculated, coefficients of components in three directions, i.e., x, y and z directions are optimized, and according to intra prediction of a point cloud, overall geometric information of the point cloud is better captured, so that the intra-frame prediction is more accurate, and the attribute compression performance of the point cloud is improved.

The point cloud intra prediction method based on weights optimization of the neighbor of the present invention comprises the following steps A and B:

A. executing steps (1) to (5) at an encoder, which comprises:

(1) constructing LODs: traversing points in a point cloud and respectively adding the points into the LODs thereof, wherein the specific construction process comprises: sorting all the points in the point cloud according to a Morton code order, namely, carrying out down-sampling on the sorted points according to preset number of layers of the LODs, wherein the points obtained after sampling each time form a layer of LODs, the sampling distances vary from large to small until the whole LODs are obtained, and the point cloud sorted in the order of LODs is expressed as a point cloud (LODs);

(2) looking for neighbors: determining K nearest neighboring points of a current point, which comprises: determining the K nearest neighboring points of the current point according to spatial Euclidean distances from the points in the point cloud to the current point; and specifically, traversing the whole point cloud space according to the order of LODs, and looking for K nearest neighboring points (the neighbors) for the current point O from a set of points already processed according to the Euclidean distances when the current point is processing;

(3) calculating weights of the neighbors: calculating an optimized weight of each nearest neighboring point in the K nearest neighboring points of the current point according to coordinates of the current point and coordinates of the K nearest neighboring points, wherein specifically, when the geometric position of the current point is set as (x, y, z), and the geometric position of each neighbor in the K neighbors is set as $(x_i, y_i, z_i)_{i=1,2,\ldots,K}$, the weight of each neighbor is $(w_i=1/\alpha^*(x-x_i)^2+\beta^*(y-y_i)^2+\gamma^*(z-z_i)^2)_{i=1,2,\ldots,K}$, and $\alpha$, $\beta$ and $\gamma$ are coefficients in the three directions, i.e., the x, y and z directions and need to be set according to the characteristics of a data set; Taking one nearest neighboring point as an example, the step comprises: calculating the differences between the current point and the nearest neighboring point on three coordinate components, i.e., x, y and z coordinate components, and calculating squared values respectively, so as to obtain quadratic differences between the current point and the nearest neighboring point on the three coordinate components, i.e., the x, y and z coordinate components; respectively multiplying the quadratic differences between the current point and the nearest neighboring point on the three coordinate components, i.e., the x, y and z coordinate components by corresponding coefficients $\alpha$, $\beta$ and $\gamma$, so as to obtain weighted quadratic differences between the current point and the nearest neighboring point on the three coordinate components, i.e., the x, y and z coordinate components, wherein $\alpha$, $\beta$ and $\gamma$ are constants, and default values of $\alpha$, $\beta$ and $\gamma$ are 1, 1, 1; summing the three weighted quadratic differences between the current point and the nearest neighboring point on the three coordinate components, i.e., the x, y and z coordinate components, so as to obtain a weighted distance square value between the current point and the nearest neighboring point; calculating a reciprocal value of the weighted distance square value of the current point and the nearest neighboring point, so as to obtain the optimized weight of the nearest neighboring point; and calculating the optimized weights of all the K nearest neighboring points of the current point.

(4) calculating an attribute prediction value: carrying out weighted summation on attribute reconstruction values of the K nearest neighboring points by utilizing the optimized weights of the K nearest neighboring points of the current point, and calculating the attribute prediction value of the current point, wherein the step comprises: acquiring the optimized weight and the attribute reconstruction value of each nearest neighboring point in the K nearest neighboring points of the current point; dividing the optimized weight of each nearest neighboring point in the K nearest neighboring points of the current point by the sum of the optimized weights of the K nearest neighboring points, so as to obtain relative weights of the K nearest neighboring points of the current point; and multiplying the relative weight of each nearest neighboring point in the K nearest neighboring points of the current point by the attribute reconstruction value thereof in a one-to-one correspondence manner and summing K products, so as to obtain the attribute prediction value of the current point; and specifically, when the attribute reconstruction value of each neighbor is $(\tilde{a}_i)_{i=1,2,\ldots,K}$, the weight of each neighbor is $w_i$, the attribute prediction value of the current point is $a=\text{Round}(\Sigma_{i=1}^{K}w_i/\Sigma_{i=1}^{K}w_i\tilde{a}_i)$;

(5) generating a point cloud attribute compression bitstream: carrying out encoding processing according to the attribute prediction value of the current point, wherein the step comprises:

calculating the difference between an attribute value and the attribute prediction value of the current point so as to determine a prediction residual of the current point; encoding the prediction residual by carrying out transformation, quantization and entropy coding, so as to obtain the bitstream; and specifically, calculating residual values of the attributes of the point cloud and then carrying out transformation, quantization and entropy coding on the residual values, so as to obtain the bitstream of the attributes of the point cloud, which is also the point cloud attribute compression bitstream.

B. Executing steps (6) to (10) at a decoding end, which comprises:

(6) constructing the LODs, which is the same as the step (1);

(7) looking for the neighbors, which is the same as the step (2);

(8) calculating the weights of the neighbors, which is the same as the step (3);

(9) calculating the attribute prediction value, which is the same as the step (4);

(10) reconstructing attributes of the point cloud: carrying out decoding processing according to the attribute prediction value of the current point, wherein the step comprises: carrying out entropy decoding, inverse quantization and inverse transformation, so as to obtain the prediction residual of the current point; and determining the attribute value of the current point according to the sum of the attribute prediction value and the prediction residual of the current point.

A device involved in the method of the present invention comprises a point cloud encoding device and a point cloud decoding device, wherein the point cloud encoding device comprises:

a first determination module used for determining the K nearest neighboring points of the current point and the first determination is specifically used for determining the K nearest neighboring points of the current point according to the spatial Euclidean distances from the points in the point cloud to the current point;

a second determination module used for calculating an optimized weight of each nearest neighboring point in the K nearest neighboring points of the current point according to coordinates of the current point and coordinates of the K nearest neighboring points; the second determination module is specifically used for: taking one nearest neighboring point as an example, calculating the differences between the current point and the nearest neighboring point on the three coordinate components, i.e., the x, y and z coordinate components, and respectively calculating square values, so as to obtain the quadratic differences between the current point and the nearest neighboring point on the three coordinate components, i.e., the x, y and z coordinate components; respectively multiplying the quadratic differences between the current point and the nearest neighboring point on the three coordinate components, i.e., the x, y and z coordinate components by the corresponding coefficients α, β and γ, so as to obtain the weighted quadratic differences between the current point and the nearest neighboring point on the three coordinate components, i.e., the x, y and z coordinate components, wherein α, β and γ are constants, and the default values of α, β and γ are 1, 1, 1 and can be modified and set; summing the three weighted quadratic differences between the current point and the nearest neighboring point on the three coordinate components, i.e., the x, y and z coordinate components, so as to obtain the weighted distance square value between the current point and the nearest neighboring point; calculating the reciprocal value of the weighted distance square value between the current point and the nearest neighboring point, so as to obtain the optimized weight of the nearest neighboring point; and calculating the optimized weights of all the K nearest neighboring points of the current point;

a third determination module used for carrying out weighted summation on the attribute reconstruction values of the K nearest neighboring points by utilizing the optimized weights of the K nearest neighboring points of the current point, so as to obtain an attribute prediction value of the current point, wherein the third determination module is specifically used for: acquiring the optimized weight and the attribute reconstruction value of each nearest neighboring point in the K nearest neighboring points of the current point; dividing the optimized weight of each nearest neighboring point in the K nearest neighboring points of the current point by the sum of the optimized weights of the K nearest neighboring points, so as to obtain the relative weights of the K nearest neighboring points of the current point; and multiplying the relative weight of each nearest neighboring point in the K nearest neighboring points of the current point by the attribute reconstruction value thereof in a one-to-one correspondence manner and summing the K products, so as to obtain the attribute prediction value of the current point;

an encoding module used for carrying out encoding processing according to the attribute prediction value of the current point, and specifically used for: calculating the difference between the attribute value and the attribute prediction value of the current point and to determine the prediction residual of the current point; and encoding the prediction residual by carrying out transformation, quantization and entropy coding, so as to obtain the bitstream.

The point cloud decoding device comprises:

a first determination module used for determining the K nearest neighboring points of the current point and specifically used for determining the K nearest neighboring points of the current point according to the spatial Euclidean distances from the points in the point cloud to the current point; a second determination module used for calculating an optimized weight of each nearest neighboring point in the K nearest neighboring points of the current point according to coordinates of the current point and coordinates of the K nearest neighboring points; the second determination module is specifically used for: taking one nearest neighboring point as an example, and the second determination module is specifically used for calculating the differences between the current point and the nearest neighboring point on the three coordinate components, i.e., the x, y and z coordinate components, and respectively calculating square values, so as to obtain the quadratic differences between the current point and the nearest neighboring point on the three coordinate components, i.e., the x, y and z coordinate components; respectively multiplying the quadratic differences between the current point and the nearest neighboring point on the three coordinate components, i.e., the x, y and z coordinate components by the corresponding coefficients $\alpha$, $\beta$ and $\gamma$, so as to obtain the weighted quadratic differences between the current point and the nearest neighboring point on the three coordinate components, i.e., the x, y and z coordinate components, wherein $\alpha$, $\beta$ and $\gamma$ are constants, and the default values of $\alpha$, $\beta$ and $\gamma$ are 1, 1, 1 and can be modified and set; summing the three weighted quadratic differences between the current point and the nearest neighboring point on the three coordinate components, i.e., the x, y and z coordinate components, so as to obtain the weighted distance square value between the current point and the nearest neighboring point; and calculating the reciprocal value of the weighted distance square value between the current point and the nearest neighboring point, so as to obtain the optimized weight of the nearest neighboring point;

a third determination module used for carrying out weighted summation on the attribute reconstruction values of the K nearest neighboring points by utilizing the optimized weights of the K nearest neighboring points of the current point, so as to obtain an attribute prediction value of the current point, wherein the third determination module is specifically used for: acquiring the optimized weight and the attribute reconstruction value of each nearest neighboring point in the K nearest neighboring points of the current point; dividing the optimized weight of each nearest neighboring point in the K nearest neighboring points of the current point by the sum of the optimized weights of the K nearest neighboring points, so as to obtain the relative weights of the K nearest neighboring points of the current point; and multiplying the relative weight of each nearest neighboring point in the K nearest neighboring points of the current point by the attribute reconstruction value thereof in a one-to-one correspondence manner and summing the K products, so as to obtain the attribute prediction value of the current point;

a decoding module used for carrying out decoding processing according to the attribute prediction value of the current point, and specifically used for carrying out entropy decoding of a bitstream, inverse quantization and inverse transformation, so as to obtain the prediction residual of the current point; and determining the attribute value of the current point according to the sum of the attribute prediction value and the prediction residual of the current point.

A specific implementation steps are described as follows:

FIG. 1 shows a structural schematic diagram of an attribute compression encoder of an embodiment, and steps (1) to (5) are executed at an encoder, which comprises:

(1) constructing LODs: the number of LODs layers of a point cloud file named as Ford_01_vox1 mm-0100.ply is set as 8 in configuration file.

when in first traversing, down-sampling is carried out on the whole point cloud to form a set $O_0$, then $LODs_0=O_0$, and residual points are put into $R_0$;

when in second traversing, down-sampling is carried out on $R_0$, and obtained points form a set $O_1$, then $LODs_1=LODs_0 \cup O_1$, and residual points are put into $R_1$;

when in seventh traversing, down-sampling is carried out on $R_5$, and obtained points form a set $O_6$, then $LODs_6=LODs_5 \cup O_6$, and residual points form $O_7$, then $LODs_7=LODs_6 \cup O_7$;

and so, the eight layers of LODs of the point cloud Ford_01_vox1 mm-0100.ply are constructed, so as to generate the point cloud sorted by the LODs, which is expressed as the point cloud (LODs).

(2) Looking for neighbors: for each point in the point cloud (LODs), the maximum number of K neighbors of the point cloud Ford_01_vox1 mm-0100.ply is set as 3 in the configuration files; and looking for the neighbors from points before a current point, and taking three nearest points with the smallest Euclidean distances as the neighbors of the current point, wherein if the current point is a first point in the point cloud (LODs), the current point has no neighbor; if the current point is a second point in the point cloud (LODs), one neighbor is found at most for the current point; and similarly, two neighbors are found at most for a third point, three neighbors are found at most for a fourth point, and three neighbors are found at most for the following points;

(3) calculating the weight of each neighbor: introducing $\alpha$, $\beta$ and $\gamma$ and calculating the weight of the neighbor, wherein when the geometric position of the current point is (x, y, z), the geometric position of each neighbor in the three neighbors is $(x_i, y_i, z_i)_{i=1,2,3}$, and the coefficients in three directions, i.e., the x, y and z directions are set: $\alpha=1$, $\beta=1$, and $\gamma=3$, and then the weight of each neighbor is $(w_i=1/\alpha*(x-x_i)^2+\beta*(y-y_i)^2+\gamma*(z-z_i)^2)_{i=1,2,\ldots,K}$;

(4) calculating an attribute prediction value, wherein when the attribute reconstruction value of each neighbor is $(\tilde{a}_i)_{i=1,2,3}$, and the weight of each neighbor is $w_i$, the attribute prediction value of the current point is $a=\text{Round}(\Sigma_{i=1}^{K}w_i/\Sigma_{i=1}^{K}w_i\tilde{a}_i)$, and the attribute reconstruction value is obtained by carrying out inverse quantization and inverse transformation and utilizing the attribute prediction value;

(5) generating a point cloud attribute compression bitstream: calculating residual values of the attributes of the point cloud and then carrying out transformation, quantization and entropy coding on the residual values, so as to obtain the point cloud attribute compression bitstream.

Figure 2:
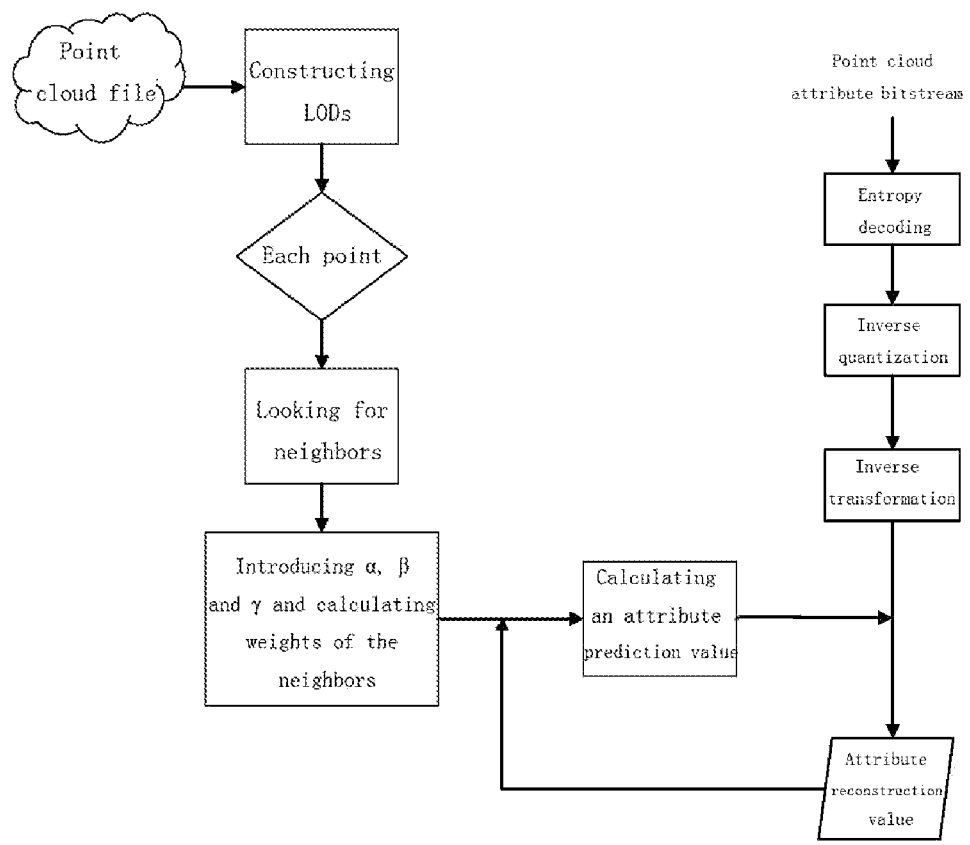
FIG. 2 is a schematic diagram of a flow of an attribute compression decoder of the embodiment.

FIG. 2 shows a structural schematic diagram of an attribute compression decoder of an embodiment, and steps (6) to (10) are executed at a decoder, which comprises:

(6) constructing LODs, which is the same as the step (1);

(7) looking for neighbors, which is the same as the step (2);

(8) calculating the weights of the neighbors, which is the same as the step (3);

(9) calculating an attribute prediction value, which is the same as the step (4);

(10) reconstructing attributes of the point cloud: decoding the point cloud attribute bitstream, so as to obtain an attribute value of the current point; then carrying out inverse quantization and inverse transformation, so as to obtain a residual value of the current point; and summing the residual value and the predicted value, so as to obtain an attribute reconstruction value of the point cloud.

In order to verify the effect of the present invention, the effect after the coefficients of the components of distance in the x, y and z direction are optimized when calculating the weights of the neighbors in the point cloud attribute compression module is tested in a Category-3 data set according to the CTC (Common Test Condition) provided by TMC13v6, and the result is shown in FIG. 3.

FIG. 3A and FIG. 3B are the experimental results suitable for 'lifting transform strategy based on the LODs', the experimental condition of FIG. 3A is lossless geometry and lossy attributes, and the experimental condition of FIG. 3B is lossy geometry and lossy attributes.

It can be figured out from FIG. 3A and FIG. 3B that the method of the present invention can obtain gain under two CTCs: for a reflectance attribute, 5.8% and 5.5% of rate-distortion gains are respectively obtained under the conditions of lossless geometry and lossy attributes and the conditions of lossy geometry and lossy attributes; and for a color attribute, 0.4%-1.3% of rate-distortion gain is obtained under the conditions of lossless geometry and lossy attributes, and the 1.9%-3.0% of rate-distortion gain is obtained under the conditions of lossy geometry and lossy attributes.

The present invention provides a point cloud intra prediction method and device based on weights optimization of neighbors. The method adopts the following solution: when intra prediction is performed on attribute compression of the point cloud, the weights of the neighbors that the points referred to in the point cloud are optimized based on a density degree difference of the point cloud in the three directions, i.e., the x, y and z directions; and the coefficients are set according to the characteristics of the data set which is the density degree of distribution of the points in the point cloud in the three directions, i.e., the x, y and z directions, so that the better intra attribute prediction value is obtained, and the compression performance is improved. Specifically, the coefficients of the components of the distance in the three directions, i.e., the x, y and z directions are optimized when the weights of the neighbors are calculated. According to the method, the accuracy of intra prediction can be improved by means of enhancing the utilization of overall geometric information of the point cloud; and then transformation, quantification and entropy coding are carried out on the prediction residuals, so that a better point cloud attribute compression performance is achieved.

It should be noted that the embodiments are published for helping further understanding for the present invention, but those skilled in the art should understand that various replacements and modifications without departing from the spirit and scope of the present invention and the appended claims are possible. Therefore, the present invention is not limited to the contents disclosed by the embodiments, and the required protection scope of the present invention is subject to the scope defined by the claims.

INDUSTRIAL APPLICATION

The point cloud intra prediction method and device based on weights optimization of neighbors can be widely used in the technical field of digitization in the real world. With the rapid development of three-dimensional scanning devices (laser, radar and the like), the precision and the resolution of the point cloud are higher. The high-precision point cloud of the present invention is widely applied to construction of an urban digital map and plays a technical supporting role in popular researches such as a smart city, autonomous driving, preservation of cultural relics and the like.

The invention claimed is:

1. A point cloud intra prediction method based on weight optimization of a neighbor, comprising:

determining K nearest neighboring points of a current point;

calculating an optimized weight of each nearest neighboring point of the current point according to a coordinate of the current point and coordinates of the K nearest neighboring points by optimizing corresponding coefficients of x, y and z coordinate components of distances between the current point and the K nearest neighboring point;

calculating the differences between the current point and the nearest neighboring point on the x, y and z coordinate components and calculating the square values respectively, so as to obtain quadratic differences between the current point and the nearest neighboring point on the x, y and z coordinate components;

respectively multiplying the quadratic differences between the current point and the nearest neighboring point on the x, y and z coordinate components by corresponding coefficients $\alpha$, $\beta$ and $\gamma$, so as to obtain weighted quadratic differences between the current point and the nearest neighboring point on the x, y and z coordinate components;

summing the three weighted quadratic differences between the current point and the nearest neighboring point on the x, y and z coordinate components, so as to obtain a weighted distance square value between the current point and the nearest neighboring point;

calculating a reciprocal value of the weighted distance square value between the current point and the nearest neighboring point, so as to obtain the optimized weight of the nearest neighboring point;

carrying out weighted summation on attribute reconstruction values of the K nearest neighboring points by utilizing the optimized weights of the K nearest neighboring points of the current point, so as to obtain an attribute prediction value of the current point; and carrying out coding processing according to the attribute prediction value of the current point, comprising:

determining a prediction residual of the current point by calculating the difference between an attribute value and the attribute prediction value of the current point; and encoding the prediction residual by carrying out transformation, quantization and entropy coding, so as to obtain a bitstream.

2. The method according to claim 1, wherein the determining K nearest neighboring points of the current point comprises:

determining the K nearest neighboring points of the current point according to spatial distances from the points in the point cloud to the current point.

3. The method according to claim 1, wherein the carrying out weighted summation on attribute reconstruction values of the K nearest neighboring points by utilizing the optimized weights of the K nearest neighboring points of the current point, and calculating an attribute prediction value of the current point comprises:

acquiring the optimized weight and an attribute reconstruction value of each nearest neighboring point in the K nearest neighboring points of the current point;

dividing the optimized weight of each nearest neighboring point in the K nearest neighboring points of the current point by the sum of the optimized weights of the K nearest neighboring points, so as to obtain relative weights of the K nearest neighboring points of the current point; and multiplying the relative weight of each nearest neighboring point in the K nearest neighboring points of the current point by the attribute reconstruction value thereof in a one-to-one correspondence manner and summing the K products, so as to obtain an attribute prediction value of the current point.

4. The method according to claim 1, further comprising carrying out decoding processing according to the attribute prediction value of the current point, specifically comprising:

carrying out entropy decoding of the bitstream, inverse quantization and inverse transformation, so as to obtain the prediction residual of the current point; and determining an attribute reconstruction value of the current point according to the sum of the attribute prediction value and the prediction residual of the current point.

5. A device for point cloud intra prediction, comprising:

a first determination module used for determining K nearest neighboring points of the current point;

a second determination module used for calculating an optimized weight of each nearest neighboring point of the current point according to the coordinate of the current point and the coordinates of the K nearest neighboring points by optimizing corresponding coefficients of x, y and z coordinate components of distances between the current point and the K nearest neighboring points;

wherein, calculating differences between the current point and the nearest neighboring point on the x, y and z coordinate components and calculating square values respectively, so as to obtain quadratic differences between the current point and the nearest neighboring point on the x, y and z coordinate components; respectively multiplying the quadratic differences between the current point and the nearest neighboring point on the x, y and z coordinate components by the corresponding coefficients α, β and γ, so as to obtain weighted quadratic differences between the current point and the nearest neighboring point on the x, y and z coordinate components; summing the three weighted quadratic differences between the current point and the nearest neighboring point on the x, y and z coordinate components, so as to obtain a weighted distance square value between the current point and the nearest neighboring point; calculating the reciprocal value of the weighted distance square value between the current point and the nearest neighboring point, so as to obtain the optimized weight of the nearest neighboring point;

a third determination module used for carrying out weighted summation on attribute reconstruction values of the K nearest neighboring points by utilizing the optimized weights of the K nearest neighboring points of the current point and calculating an attribute prediction value of the current point; and an encoding module, wherein the encoding module is specifically used for:

determining a prediction residual of the current point by calculating the difference between an attribute value and the attribute prediction value of the current point; and encoding the prediction residual by carrying out transformation, quantization and entropy coding, so as to obtain a bitstream.

6. The device according to claim 5, wherein the third determination module is specifically used for:

acquiring the optimized weight and an attribute reconstruction value of each nearest neighboring point in the K nearest neighboring points of the current point;

dividing the optimized weight of each nearest neighboring point in the K nearest neighboring points of the current point by the sum of the optimized weights of the K nearest neighboring points, so as to obtain the relative weights of the K nearest neighboring points of the current point; and multiplying the relative weight by the attribute reconstruction value of each nearest neighboring point in the K nearest neighboring points of the current point respectively and summing the K products, so as to obtain the attribute prediction value of the current point.

7. The device according to claim 5, further comprising a decoding module, wherein the decoding module is specifically used for:

carrying out entropy decoding of the bitstream, inverse quantization and inverse transformation, so as to obtain the prediction residual of the current point; and determining an attribute reconstruction value of the current point according to the sum of the attribute prediction value and the prediction residual of the current point.

* * * * *